US012808516B1

(12) United States Patent
Sollars, II

(10) Patent No.: US 12,808,516 B1
(45) Date of Patent: Nov. 24, 2026

(54) FLOATING POOL LIGHT

(71) Applicant: Cootway USA LLC, Chandler, AZ (US)

(72) Inventor: Thomas Allen Sollars, II, Chandler, AZ (US)

(73) Assignee: Cootway USA LLC, Chandler, AZ (US)

( * ) Notice: Subject to any disclaimer, the term of this patent is extended or adjusted under 35 U.S.C. 154(b) by 0 days.

(21) Appl. No.: 19/660,086

(22) Filed: Apr. 27, 2026

(30) Foreign Application Priority Data

Mar. 27, 2026 (CN) ......................... 202620399724.6

(51) Int. Cl.

| | |
|---|---|
| ***F21V 15/01*** | (2006.01) |
| ***F21S 9/03*** | (2006.01) |
| ***F21V 14/06*** | (2006.01) |
| ***F21V 31/00*** | (2006.01) |
| *F21W 131/401* | (2006.01) |

(52) U.S. Cl.
CPC .............. *F21V 15/01* (2013.01); *F21S 9/037* (2013.01); *F21V 14/06* (2013.01); *F21V 31/00* (2013.01); *F21W 2131/401* (2013.01)

(58) Field of Classification Search
CPC .......... F21V 15/01; F21V 14/06; F21V 31/00; F21S 9/037; F21W 2131/401
See application file for complete search history.

(56) References Cited

U.S. PATENT DOCUMENTS

| | | | | |
|---|---|---|---|---|
| 5,934,796 A * | 8/1999 | Quereau | F21V 7/0025 362/101 | |
| 7,413,319 B2 * | 8/2008 | Longoria | G09F 13/24 362/267 | |
| 8,827,496 B2 * | 9/2014 | VanderSchuit | F21S 10/007 362/184 | |
| 12,181,348 B1 * | 12/2024 | Li | G01K 1/14 | |
| 2002/0085392 A1 * | 7/2002 | Hajianpour | F21V 3/04 362/186 | |
| 2015/0184844 A1 * | 7/2015 | Zhang | F21V 29/73 362/96 | |
| 2016/0215962 A1 * | 7/2016 | Chien | F21K 9/232 | |
| 2025/0171336 A1 * | 5/2025 | Gong | C02F 1/30 | |
| 2025/0243092 A1 | 7/2025 | Wan et al. | | |
| 2025/0251100 A1 | 8/2025 | Wan et al. | | |

* cited by examiner

*Primary Examiner* — Evan P Dzierzynski

(57) ABSTRACT

A floating pool light includes: a floating component, a light source component, a driving component, and a scattering component. The floating component is configured as a hollow sealed structure and is made of a transparent material. The light source component is disposed inside the floating component. The driving component is mounted on the floating component. The scattering component is drivingly connected to the driving component and covered outside the light source component. Light emitted by the light source component is configured to be irradiated onto the floating component via the scattering component. The scattering component is configured to convert a form of the light and project the converted light onto a target position of the floating component. The driving component is configured to drive the scattering component to pivot relative to the light source component within the floating component.

15 Claims, 4 Drawing Sheets

A–A

FLOATING POOL LIGHT

RELATED APPLICATIONS

The present patent disclosure claims priority benefit to Chinese Patent Application No. 2026203997246, filed on Mar. 27, 2026, the contents of each of which are incorporated herein by reference.

BACKGROUND

1. Technical Field

The present disclosure relates to lighting equipment for swimming pools, and in particular to a floating pool light.

2. Background Information

Pool lights in the related art that float on a water surface typically adopt a structural design in which a waterproof housing encapsulates internal circuits and light source components, and a buoyancy assembly is configured to keep the light stably suspended on the water surface. Such a pool light generally includes a light-transmitting cover on an upper portion, a floating ring in a middle portion, and a ballast compartment on a lower portion, with a battery module, a control circuit board, and a light emitting unit integrated inside the pool light. To adapt to a complex light refraction environment underwater or on the water surface, the housing of the pool light is often made of a highly transparent corrosion-resistant material (such as PC or ABS engineering plastic) and has a strict IP68 waterproof rating. In a traditional structure, the light emitting unit is usually fixedly installed at a central position of the lamp or uniformly distributed along a circumference. The light emitting unit mainly relies on static light emission to provide basic illumination or decorative effects.

BRIEF SUMMARY

The present disclosure provides a floating pool light, including: a floating component, a light source component, a driving component, and a scattering component. The floating component is configured as a hollow sealed structure and is made of a transparent material, and is configured for floating on a water surface. The light source component is disposed inside the floating component, and is configured for emitting light. The driving component is mounted on the floating component. The scattering component is drivingly connected to the driving component and is covered outside the light source component. Light emitted by the light source component is configured to be irradiated onto the floating component via the scattering component. The scattering component is configured to convert a form of the light and project the converted light onto a target position of the floating component. The driving component is configured to drive the scattering component to pivot relative to the light source component within the floating component.

BRIEF DESCRIPTION OF THE DRAWINGS

The drawings in the specification, which constitute a part of the present disclosure, are configured to provide further understanding of the present disclosure. The illustrative embodiments of the present disclosure and their descriptions are for explanation purposes and do not constitute improper limitations on the present disclosure.

DETAILED DESCRIPTION OF THE DRAWINGS AND THE PRESENTLY PREFERRED EMBODIMENTS

Figure 1:
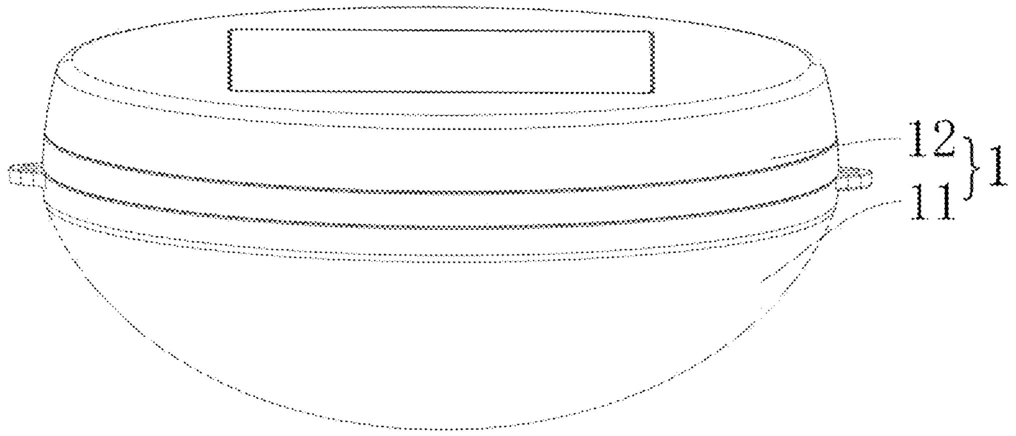
FIG. 1 is a perspective view of a floating pool light according to embodiment 1 of the present disclosure.

The present disclosure will be described in detail below with reference to the accompanying drawings and in conjunction with the embodiments. Various examples are provided by way of explanation of the present disclosure and not as a limitation to the present disclosure. In fact, it will be apparent to those skilled in the art that modifications and variations may be made in the present disclosure without departing from the scope or spirit of the present disclosure. For example, features illustrated or described as part of one embodiment may be used for another embodiment to yield yet another embodiment. Therefore, it is expected that the present disclosure includes such modifications and variations that fall within the scope of the appended claims and equivalents thereof.

In the description of the present disclosure, the orientations or positional relationships indicated by such terms as "longitudinal", "transverse", "upper", "lower", "front", "rear", "left", "right", "vertical", "horizontal", "top", "bottom" are the orientation or positional relationships shown based on the accompanying drawings. These terms are used merely for the convenience of describing the present disclosure rather than requiring the present disclosure to be constructed or operated in a particular orientation, and therefore should not be construed as limiting the present disclosure. The terms "connected," "connection," and "arranged" as used in the present disclosure should be understood in a broad sense. For example, the terms may be a fixed connection, or a detachable connection; may be a direct connection, or an indirect connection through an intermediate component; may be a wired electrical connection, a wireless electrical connection, or a wireless communication signal connection. For those skilled in the art, the specific meanings of the above terms may be understood according to the specific circumstances.

One or more examples of the present disclosure are shown in the accompanying drawings. The detailed description uses numerical and alphabetical references to refer to features in the drawings. Similar or like reference numerals in the drawings and description have been configured to refer to similar or like parts of the present disclosure. As used herein, the terms "first," "second," "third" and the like are used interchangeably to distinguish one component from another and are not intended to indicate the position or importance of the individual components.

The structure of a pool light in the related art is relatively simple, but the function of the pool light is relatively limited, making it difficult to meet the diverse demands of modern swimming pools for dynamic atmosphere creation.

To overcome the problems of traditional static illumination, some existing technical solutions attempt to achieve changeable dynamic lighting effects through complex mechanical and electronic coordination. Such solutions typically use a plurality of LED chips arranged into a specific light matrix array. A control circuit precisely adjusts a blinking frequency, a brightness, and a color combination of each LED chip, initially forming a basic array pattern of light spots. More critically, to achieve a more visually striking dynamic effect, such a lamp further includes a driving component (such as a micro motor) inside the lamp. The driving component is drivingly connected to an entire lighting mechanism, causing an entire light emitting assembly (including the LED chip matrix) to rotate on the water surface or inside the housing. Through the dual action of electronically controlling the blinking of the LED chips and mechanically driving the rotation of the whole assembly, the light forms a scanning trajectory in space, thereby combining into changeable light spots, dynamic patterns, or a visual effect resembling flowing water.

However, while achieving dynamic lighting effects, the above related art also exposes significant technical drawbacks. First, to form a sufficiently rich and clear dynamic pattern or array of light spots, a high-density integration process of multiple LED chips is required to construct a large light matrix array. This not only greatly increases the number of electronic components, but also significantly raises the manufacturing cost due to a precise integrated packaging requirement. Second, as a solution that uses a motor to drive the entire lighting mechanism to physically rotate is adopted, a sufficiently large mechanical rotation space may be reserved inside the lamp to reduce motion interference. This directly leads to an overly large volume and a bulky structure of the lighting mechanism and even of the entire lamp. Such a large-volume, high-cost structural design not only limits an application of the lamp in diverse scenarios such as small swimming pools, home bathtubs, or portable water recreation equipment, but also runs counter to the current industry trend of lighting devices moving toward miniaturization, compactness, and low cost. The design makes it difficult to meet the urgent market demand for a high-cost-performance, portable, and multifunctional pool light.

Embodiment 1

Figure 2:
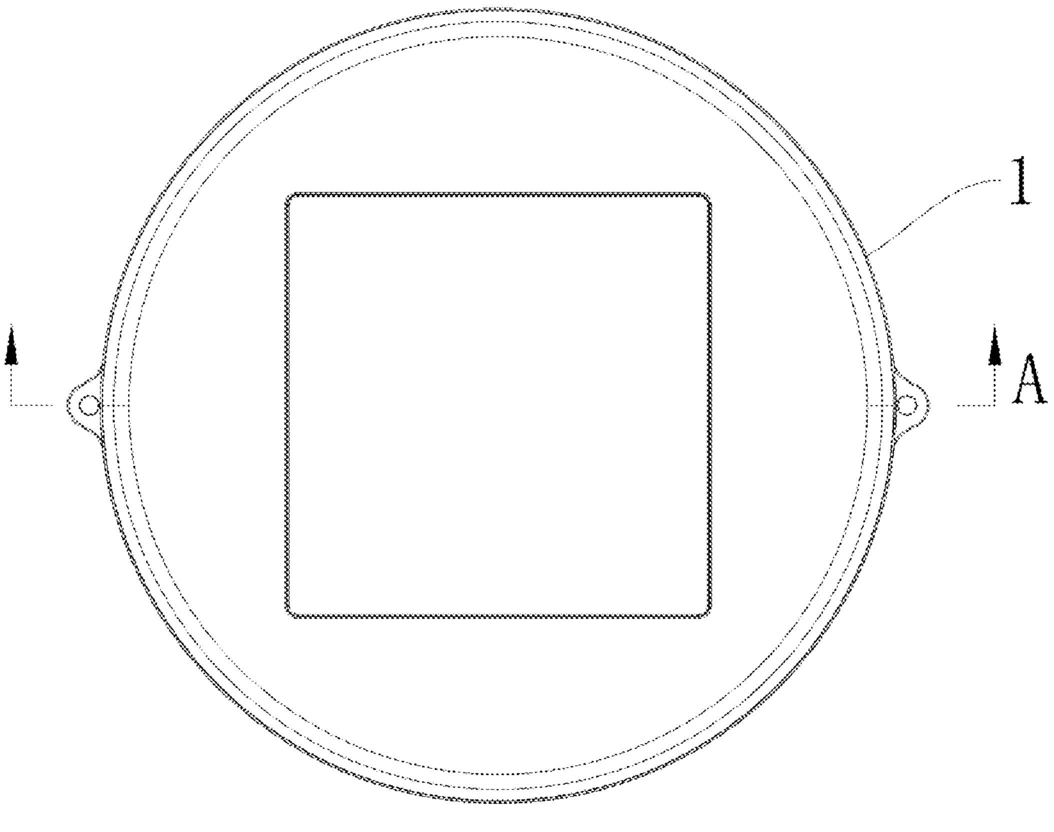
FIG. 2 is a top view of the floating pool light according to embodiment 1 of the present disclosure.
Figure 3:
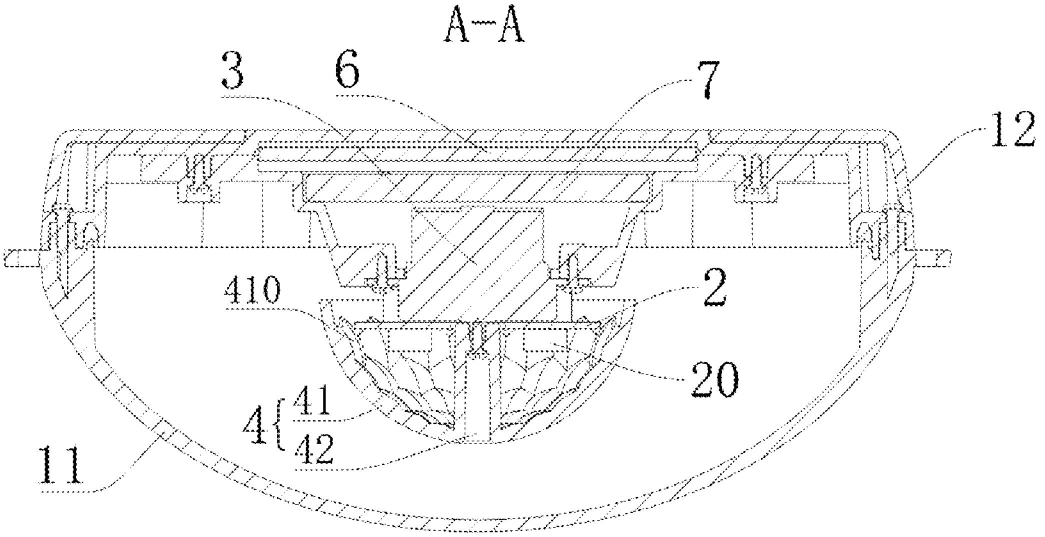
FIG. 3 is a cross-sectional view along the line A-A in FIG. 2 according to embodiment 1 of the present disclosure.

The present disclosure provides a floating pool light, including: a floating component 1, a light source component 20, a driving component 3, and a scattering component 4. As shown in FIGS. 1 to 3, the floating component 1 is configured as a hollow sealed structure and is made of a transparent material, and is configured for floating on a water surface. The light source component 20 is disposed inside the floating component 1, and is configured for emitting light. The driving component 3 is mounted on the floating component 1. The scattering component 4 is drivingly connected to the driving component 3 and is covered outside the light source component 20. The light emitted by the light source component 20 is configured to be irradiated onto the floating component 1 via the scattering component 4. The scattering component 4 is configured to convert a form of the light and project the converted light onto a target position of the floating component 1. The driving component 3 is configured to drive the scattering component 4 to pivot relative to the light source component 20 within the floating component 1.

In the present disclosure, the floating component 1 is configured as the hollow sealed structure. The floating component 1 may not only float on the water surface, but also form a receiving chamber inside the floating component 1 that isolates water, to receive optical elements and electrical elements that produce lighting effects. As the floating component 1 is made of the transparent material, light may pass through the floating component 1 and be emitted outward. The light source component 20 is fixedly disposed inside the floating component 1. The driving component 3 may be a motor and is embedded in a side wall of the floating component 1. The scattering component 4 is fixedly connected to an output shaft of the driving component 3 and is covered outside the light source component 20. Thus, driven by the driving component 3, the scattering component 4 may pivot inside the floating component 1 relative to the fixed light source component 20, allowing the light projected onto the floating component 1 to produce a dynamic moving effect. When the light emitted by the light source component 20 passes through the scattering component 4, the conversion of the light form is achieved using the principle of light refraction. The light is converted into a plurality of light rays that irradiate in different directions, and the rotation of the scattering component 4 causes the light to present a dynamically changing effect. In the present disclosure, a plurality of lighting effects may be achieved without using complex arrangements of the light source component 20. The conversion of the light form is accomplished by using the light refraction principle of the scattering component 4, and the plurality of lighting effects which are dynamic are produced as the scattering component 4 rotates.

As shown in FIG. 3, the scattering component 4 has a refraction portion 41 and a transition portion 42. The refraction portion 41 is a hollow hemispherical structure and is covered outside the light source component 20. The transition portion 42 is fixedly connected to the refraction portion 41 and is coaxial with a central axis of the refraction portion 41. The output shaft of the driving component 3 is synchronously rotatably connected to the transition portion 42.

An surface inside the refraction portion 41 is provided with a plurality of convex transparent bodies 410. The plurality of convex transparent bodies 410 form a plurality of independent light collecting areas on the refraction portion 41 to project light irradiated onto the plurality of light collecting areas to different positions on the floating component 1.

In the present disclosure, to strengthen a connection between the refraction portion 41 and the transition portion 42, the scattering component 4 may be an integrally formed structure. The refraction portion 41 is configured as the hollow hemispherical structure for being covered outside the light source component 20, allowing the light emitted by the light source component 20 to fully enter an interior of the refraction portion 41. The transition portion 42 is fixedly connected to a bottom of the refraction portion 41 and is coaxial with the central axis of the refraction portion 41 inside the refraction portion 41. The output shaft of the driving component 3 is synchronously rotatably connected with the transition portion 42, for example, by a key connection, a D-shaped shaft fit, or a set screw fixation, to ensure that the driving component 3 may drive the entire scattering component 4 to rotate smoothly about the central axis of the scattering component 4. The surface inside the refraction portion 41 is integrally formed or fixedly provided with the plurality of convex transparent bodies 410. Each of the plurality of convex transparent bodies 410 forms a corresponding one of the plurality of independent light collecting areas on the refraction portion 41. The plurality of convex transparent bodies 410 are configured to collect and refract light from the corresponding plurality of light collecting areas. For example, each of the plurality of convex transparent bodies 410 may respectively converge the light from the light source component 20 covering the corresponding one of the plurality of light collecting areas into a light ray having a smaller lighting range and stronger penetration ability. The light emitted by the light source component 20 first irradiates the plurality of light collecting areas where the plurality of convex transparent bodies 410 are located. After being refracted by the plurality of convex transparent bodies 410, the form of the light is converted from the original divergent light into the plurality of independent light rays that exit in different directions, and the plurality of independent light rays are respectively projected onto different positions on the floating component 1. As the curvature, the position, and the orientation of each of the plurality of convex transparent bodies 410 are configured to be different from one another, the light exiting through the plurality of convex transparent bodies 410 forms non-overlapping projected light spots on the floating component 1, thereby achieving a spatial dispersion of the light.

Moreover, as the driving component 3 drives the scattering component 4 to continuously pivot relative to the fixed light source component 20, the relative positions between the plurality of convex transparent bodies 410 and the light source component 20 change periodically. The incident angle of the light received by each of the plurality of convex transparent bodies 410 changes continuously, thus forming a plurality of light spots moving along a plurality of predetermined trajectories on the floating component 1, producing a dynamically changing lighting effect. Through the above structure, the present disclosure uses the array of the plurality of convex transparent bodies 410 on the refraction portion 41 of the scattering component 4, together with the rotation of the entire scattering component 4 driven by the driving component 3, to achieve a combined lighting effect of light form conversion and dynamic movement with a simple optical structure and a simple mechanical structure, reducing the cost increase and control complexity that would result from using a complex light source array or a multi-degree-of-freedom control mechanism.

Embodiment 2

Figure 4:
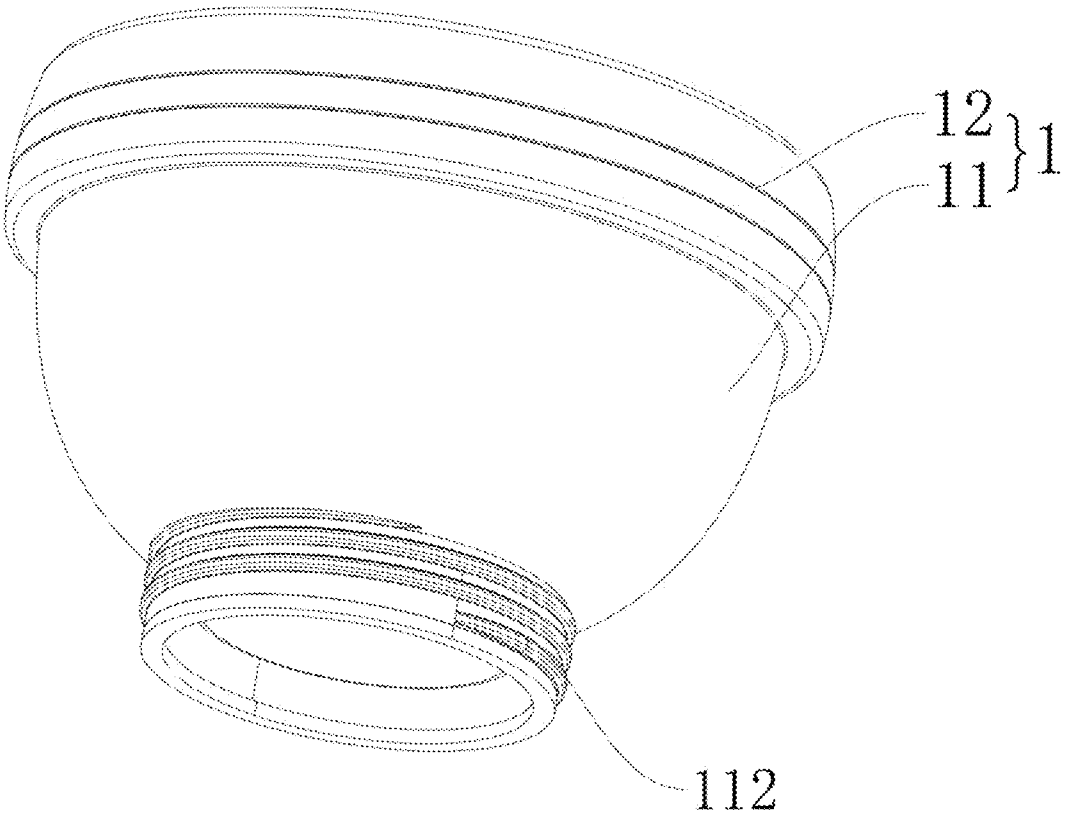
FIG. 4 is a perspective view of a floating pool light according to embodiment 2 of the present disclosure.
Figure 5:
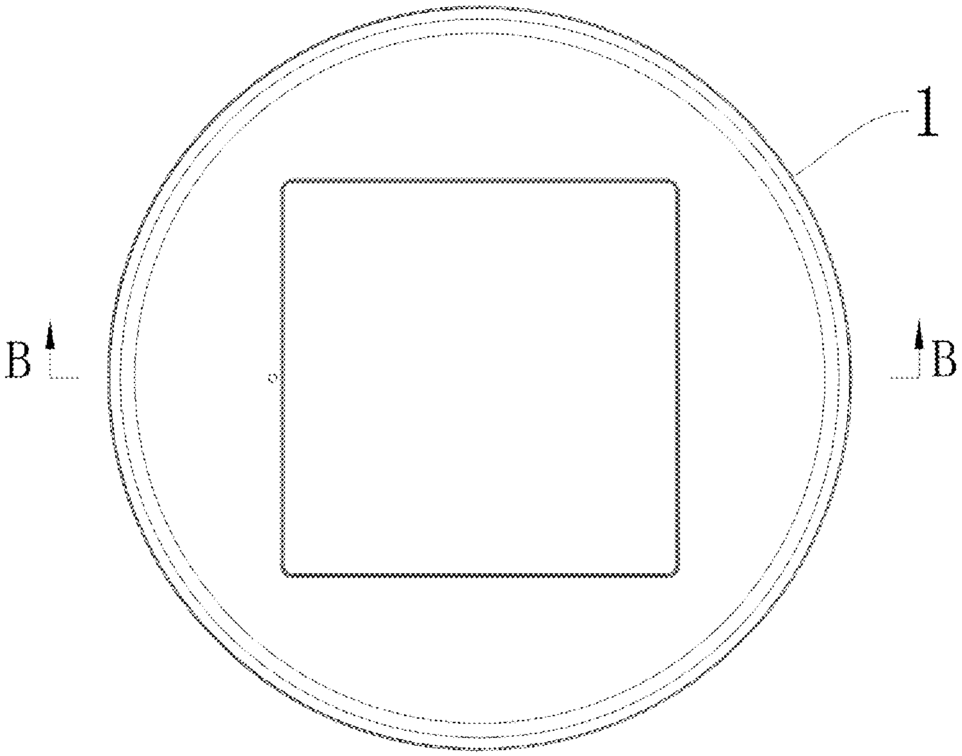
FIG. 5 is a top view of the floating pool light according to embodiment 2 of the present disclosure.
Figure 6:
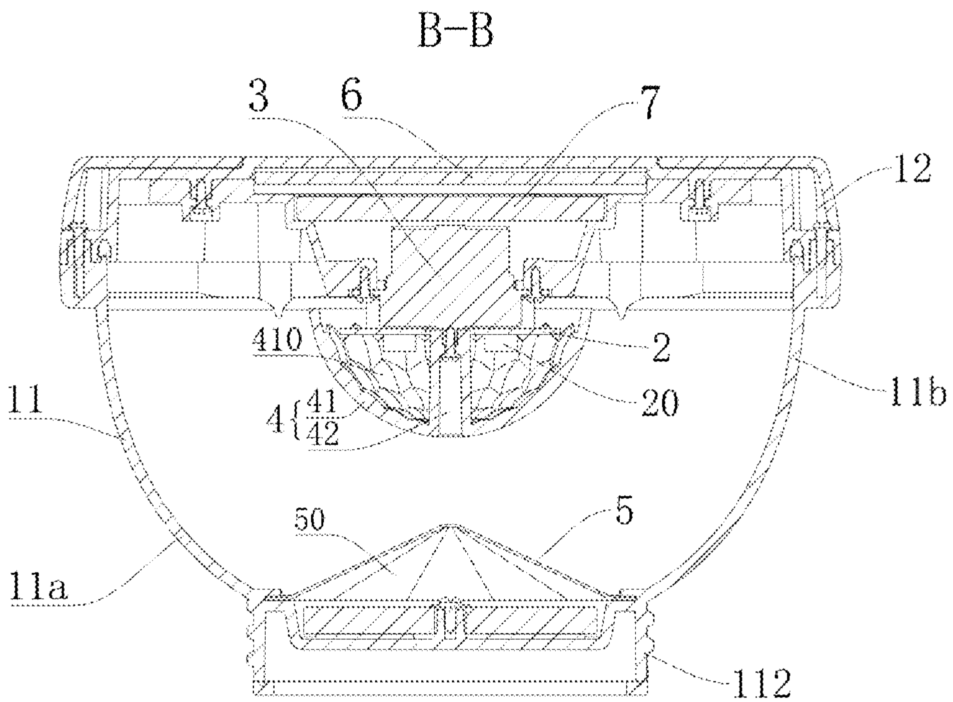
FIG. 6 is a cross-sectional view along the line B-B in FIG. 4 according to embodiment 2 of the present disclosure.

As shown in FIGS. 4 to 6, based on the floating pool light of the embodiment 1 described above, the floating component 1 has a first area 11*a* and a second area 11*b*, and the scattering component 4 faces the first area 11*a*. The floating pool light further includes a reflective component 5 provided inside the floating component 1 and located in the first area 11*a*. The reflective component 5 is configured to reflect light projected from the scattering component 4 onto the reflective component 5 to the second area 11*b*.

In the present disclosure, as the light source component 20 and the scattering component 4 are both mounted inside the floating component 1, a difference in light intensity exists between an area of the floating component 1 directly facing the light source component 20 and the scattering component 4 and an area located laterally to the light source component 20 and the scattering component 4. When the light source component 20 and the scattering component 4 are disposed inside a top portion of the floating component 1, the amount of the light rays projected through the scattering component 4 onto a lower half of the floating component 1 is generally significantly greater than the amount of light projected onto an upper half of the floating component 1. Thus, at least one the light projection dead zones tend to appear in the upper half, particularly in an area where the height is level with or higher than the scattering component 4. To solve the above problem, in the present embodiment, the floating component 1 has the first area 11*a* and the second area 11*b*. The scattering component 4 is connected to the output shaft of the driving component 3 and faces the first area 11*a*. The reflective component 5 is installed in the first area 11*a*, spaced apart from and opposite the scattering component 4, and is configured to reflect the light projected from the scattering component 4 onto the reflective component 5 to the second area 11*b*. After the reflective component 5 is further installed inside the floating component 1, the occurrence of the light projection dead zone on the floating component 1 is effectively reduced, allowing the light distribution presented on the floating component 1 to be more uniform and richer.

As shown in FIG. 6, the reflective component 5 is configured as an umbrella-shaped structure. A plurality of reflecting areas 50 are provided on the reflective component 5. The plurality of reflecting areas 50 are arranged around an axial direction of the reflective component 5. The plurality of reflecting areas 50 respectively face different directions respectively to reflect the light to different positions of the second area 11*b*.

In the present disclosure, the reflective component 5 has the umbrella-shaped structure and is fitted in the first area 11*a* of the floating component 1, for example, at an inner bottom portion of the floating component 1, and is spaced apart from and opposite the scattering component 4 located at the inner top portion of the floating component 1. The reflective component 5 is provided with a plurality of light-reflecting flat surfaces that are arranged circumferentially around a central axis of the reflective component 5 and are inclined. An angle is formed by bending between every two adjacent light-reflecting flat surfaces, the plurality of light-reflecting flat surfaces form a plurality of reflecting areas 50 facing different directions on the reflective component 5. Each of the plurality of reflecting areas 50 corresponds to a preset position of the first area 11*a*. When the light emitted by the light source component 20 is irradiated onto the reflective component 5 through the scattering component 4, the reflective component 5 reflects the light rays to different positions in the second area 11*b*. Thus, the relatively surplus light in the first area 11*a* is redistributed through the reflective component 5 to the second area 11*b*, where the amount of projected light is relatively insufficient, making the overall lighting effect projected onto the floating component 1 more uniform and richer.

Figure 7:
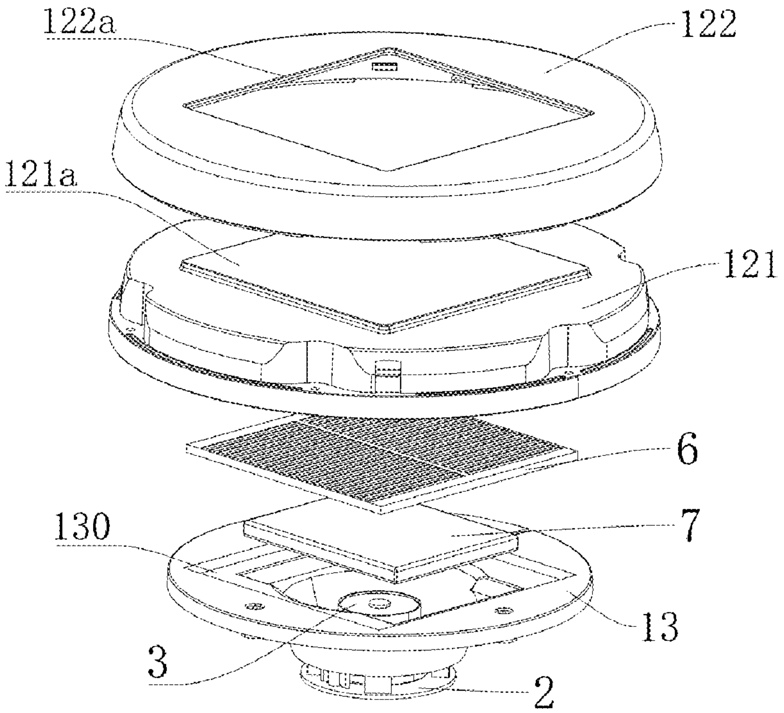
FIG. 7 is an exploded view of a cover according to some embodiments of the present disclosure.

As shown in FIG. 7, the floating component 1 includes a housing 11, a cover 12, and a fixed mounting plate 13. The housing 11 is configured as a hollow structure with a top opening. The cover 12 covers the top opening of the housing 11 to seal the hollow structure inside the housing 11. The fixed mounting plate 13 is disposed on an inner surface of the cover 12. The driving component 3 is embedded in the fixed mounting plate 13, and an output shaft of the driving component 3 extends toward the fixed mounting plate 13 in a direction away from the cover 12.

In the present disclosure, the floating component 1 includes the housing 11, the cover 12, and the fixed mounting plate 13. The housing 11 is configured as a hollow structure with a top opening. An internal space of the housing 11 is configured to receive the light source component 20, the scattering component 4, and the reflective component 5. The housing 11 is made of a transparent material to ensure that light may be transmitted outward. The cover 12 is sealed to the top opening of the housing 11, and a waterproof seal is achieved by a threaded engagement or by adding a sealing ring, thereby effectively isolating an inner cavity of the housing 11 from the external water. The fixed mounting plate 13 is disposed on the inner surface, a surface facing the interior of the housing 11, of the cover 12. The fixed mounting plate 13 serves as a mounting base for internal components. The driving component 3 is fixedly embedded in the fixed mounting plate 13, for example, by tightening with slots and screws, to ensure that the driving component 3 does not become loose during operation. The output shaft of the driving component 3 extends away from the cover 12, or protrudes into the interior of the housing 11, to connect with the scattering component 4. With the above arrangement, an installation position of the driving component 3 is located at the top portion of the floating component 1, and the output shaft of the driving component 3 extends from the top downward into the interior of the housing 11, providing sufficient axial space for the rotation of the scattering component 4. Additionally, the transmission path between the driving component 3 and the scattering component 4 is kept simple, and a rigid connection is achieved, allowing the scattering component 4 to rotate synchronously with the output shaft of the driving component 3 within the internal space of the housing 11.

As shown in FIGS. 4 and 6, an outer wall of the housing 11 is provided with a mounting portion 112. The mounting portion 112 is used for detachably connecting a target device. The mounting portion 112 is formed at a projection position of the reflective component 5 to reflect light blocked by the target device to the second area 11*b*.

In the present disclosure, the mounting portion 112 is integrally formed on the outer wall of the housing 11 or is fixed to the outer wall of the housing 11 by fasteners. The mounting portion 112 may be a snap-fit structure, a threaded interface, a magnetic structure, or a lug structure, and is configured to achieve a detachable connection with a target device (for example, a chlorinator C1 in a pool for water purification), facilitating flexible installation and modular expansion of the floating pool light in different usage scenarios. A formation position of the mounting portion 112 on the housing 11 corresponds to a projection area of the reflective component 5, and the mounting portion 112 is located within the projection range directly below the reflective component 5. When the target device is connected to the mounting portion 112, the target device itself may physically block light from the scattering component 4 or the reflective component 5. By forming the mounting portion 112 in the projection area of the reflective component 5, the light blocked by the target device exactly corresponds to a reflection path area covered by the reflective component 5. After being reflected a second time by the reflective component 5, the light may bypass the blocked area caused by the target device and be redirected to the second area 11*b*, thereby effectively reducing lighting dead zones caused by the attachment of an external accessory and ensuring the integrity and uniformity of the overall light from the floating component 1.

Figure 8:
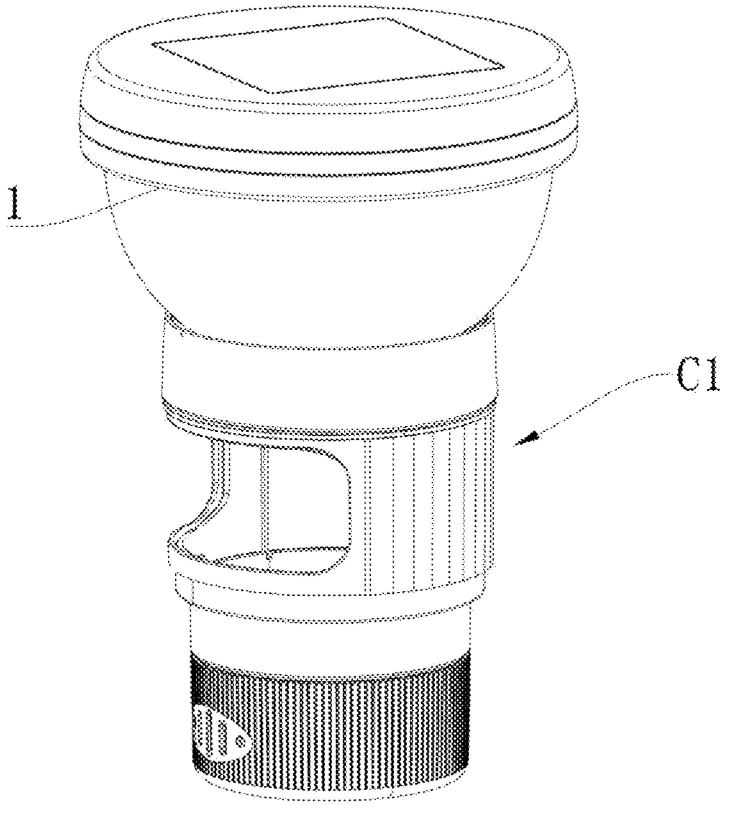
FIG. 8 is a perspective view of the floating pool light applied to a chlorinator according to some embodiments of the present disclosure.

As shown in FIG. 8, the mounting portion 112 may be configured as a threaded interface, and the target device is the chlorinator C1 that may be sealed to the threaded interface. The chlorinator C1 is screwed into the mounting portion 112 by a threaded engagement. When the floating pool light floats on the water surface, the chlorinator C1 may enter the water body, thereby purifying the pool water.

As shown in FIGS. 3, 6, and 7, the floating pool light further includes a control circuit board 2. The control circuit board 2 is installed on the side of the fixed mounting plate 13 away from the cover 12. The control circuit board 2 is defined with a central hole. The output shaft of the driving component 3 passes through the central hole to connect with the scattering component 4. The control circuit board 2 is electrically connected to the driving component 3 to control on and off of the driving component 3. The light source component 20 is integrated on the side of the control circuit board 2 away from the driving component 3 around the central hole. The light source component 20 has a color-adjusting function. The control circuit board 2 is configured to control on and off of the light source component 20 and to switch the color of light emitted by the light source component 20.

In the present disclosure, the control circuit board 2 is installed on the side, a side facing the interior of the housing 11, of the fixed mounting plate 13 away from the cover 12. The control circuit board 2 is fixed to the fixed mounting plate 13 by screws or snap-fits, and serves as a control core of the floating pool light. The central hole is formed in the center of the control circuit board 2. The output shaft of the driving component 3 passes through the central hole and is then drivingly connected to the scattering component 4, achieving a coaxial arrangement in space for mechanical transmission and electrical control, and contributing to a compact structure and small footprint. The control circuit board 2 and the driving component 3 are electrically connected by wires or a flexible flat cable. The control circuit board 2 may control starting, stopping, rotational speed, and rotational direction of the driving component 3, thereby adjusting a rotation speed and a rotation direction of the scattering component 4. The light source component 20 is integrated on the side, a side facing the scattering component 4, of the control circuit board 2 away from the driving component 3, and is arranged in a ring or an array. This ensures that the light emitted by the light source component 20 may fully fill the interior of the scattering component 4 and prevents the light from being blocked by the transition portion 42. The light source component 20 uses LED chips having a color-adjusting function (RGB). The control circuit board 2 has an integrated driver chip and a control circuit, for independently controlling on and off of the light source component 20, adjusting brightness, and switching the color of the emitted light, thereby achieving free switching among multiple lighting modes. Through the above highly integrated layout design, the present disclosure integrates drive control, light source power supply, and color adjustment functions on a single circuit board, effectively simplifying an internal wiring structure, improving reliability of electrical connections, and reserving sufficient central space for rotation of the scattering component 4.

As shown in FIG. 7, the cover 12 includes an upper cover 121 and an outer cover 122. The upper cover 121 is sealed to the housing 11 and covers the top opening. The side of the upper cover 121 facing the housing 11 is defined with a first receiving groove 121*a*. The fixed mounting plate 13 is defined with a second receiving groove 130 opposite the first receiving groove 121*a*. The first receiving groove 121*a* and the second receiving groove 130 together form a receiving space. The outer cover 122 is fastened on an end surface of the upper cover 121 away from the housing 11. The outer cover 122 is defined with a notch 122*a* at a portion projected onto the first receiving groove 121*a*.

In by the present disclosure, the cover 12 has a two-layer structure, including the upper cover 121 and an outer cover 122. The upper cover 121 is sealed to the top opening of the housing 11 by a threaded engagement or by a sealing ring, ensuring an overall watertightness of the floating component 1. A side of the upper cover 121 facing the interior of the housing 11 is defined with the first receiving groove 121*a*. The first receiving groove 121*a* may be a recessed cavity structure. The fixed mounting plate 13 is defined with the second receiving groove 130 at a corresponding position. When the fixed mounting plate 13 is fixedly installed on the upper cover 121, the first receiving groove 121*a* and the second receiving groove 130 are vertically opposite each other, and together form a closed or semi-closed receiving space for receiving a solar panel 6, a power supply member 7, or other functional components. This allows fully utilization of a space in the thickness direction of the cover 12 and reducing an increase in an overall height. The outer cover 122 is fastened on an end surface, the outermost side of the floating component 1, of the upper cover 121 away from the housing 11 to provide decoration and protection. The outer cover 122 is defined with the notch 122*a* at a position corresponding to a projection area of the first receiving groove 121*a*. The notch 122*a* may be a through hole or a hollowed-out structure, allowing external ambient light to enter the upper cover 121 through the notch 122*a*, thus providing a structural basis for a subsequent light energy collection function.

As shown in FIGS. 3, 6, and 7, the floating pool light further includes the solar panel 6 and the power supply member 7. The solar panel 6 is installed in the second receiving groove 130 of the fixed mounting plate 13. A portion of the upper cover 121 projected onto the first receiving groove 121*a* is made of a transparent material. Light may pass through the upper cover 121 via the notch 122*a* to irradiate the solar panel 6. The solar panel 6 is configured to convert light energy into electrical energy. The power supply member 7 is installed in the fixed mounting plate 13 and is located between the solar panel 6 and the driving component 3. The power supply member 7 is electrically connected to the solar panel 6 and the control circuit board 2 respectively. The power supply member 7 is configured to store the electrical energy converted by the solar panel 6 and to supply power to the driving component 3 and the light source component 20 through the control circuit board 2.

In the present disclosure, the floating pool light also integrates a solar power supply mechanism to use sunlight as an operating energy source. The solar panel 6 is installed in the second receiving groove 130 of the fixed mounting plate 13, with a photoelectric conversion surface of the solar panel 6 facing upward. A portion of the upper cover 121 corresponding to the first receiving groove 121*a* is made of a transparent material, such as transparent PC or acrylic. The notch 122*a* on the outer cover 122, the transparent area of the upper cover 121, and the solar panel 6 in the second receiving groove 130 are sequentially aligned in a vertical direction, together forming a light transmission path for external light to enter the solar panel 6. External ambient light sequentially passes through the notch 122*a* of the outer cover 122 and the transparent portion of the upper cover 121, and then irradiates the photoelectric conversion surface of the solar panel 6. The solar panel 6 converts the light energy into direct current electrical energy through the photovoltaic effect. The power supply member 7 is installed in the fixed mounting plate 13 and is located between the solar panel 6 and the driving component 3 in the thickness direction, fully utilizing an internal space of the fixed mounting plate 13. The power supply member 7 may be a rechargeable battery (such as a lithium battery) or a supercapacitor. An input terminal of the power supply member 7 is electrically connected to an output terminal of the solar panel 6 for receiving and storing the electrical energy converted by the solar panel 6. An output terminal of the power supply member 7 is electrically connected to the control circuit board 2, supplying stable power to the driving component 3 and the light source component 20 through the control circuit board 2. Additionally, the control circuit board 2 may manage a charging and discharging state of the power supply member 7 to prevent overcharging or overdischarging. Through the above structure, the present disclosure achieves self-powered operation of the floating pool light in an outdoor environment, without the need for an external power cord or frequent battery replacement, significantly improving convenience, battery life, and environmental adaptability of the product. The floating pool light is particularly suitable for outdoor water body scenarios such as swimming pools and lakes where wiring is inconvenient.

Based on the above analysis, the floating pool light provided by the present disclosure abandons the complex process in the related art of forming a matrix of light spots by densely arranging multiple LED chips to create a pattern. Instead, the light source component 20 with a scattering component have a specific refraction structure. When light pass through the rotating scattering component, the principle of light refraction is configured to convert static light into dynamically changing light in a plurality of light rays, or into light spots of a specific shape. This greatly reduces the number of electronic components (such as LED chips and drive circuit nodes) and reduces the reliance on high-precision integrated packaging processes. Consequently, the material cost and the difficulty of production and assembly are significantly lowered. In the present disclosure, the light source component 20 is fixed and does not move. Only the scattering component, which is relatively small in volume, is driven to rotate by the driving component 3. As the scattering component is much smaller than the overall lighting mechanism, the space required for rotational movement is reduced, and there is no need to reserve a large clearance area for rotation. This improvement allows the internal receiving chamber of the floating component 1 to be designed more compactly, so that greatly reducing the overall outer diameter and thickness of the floating pool light. The floating pool light may then be easily adapted to various application scenarios that have strict space requirements. Through the rotational movement of the scattering component, the fixed light source may project a plurality of visual effects such as a scanning trajectory, moving light spots, or simulated water flow. The dynamic performance achieved is equal to or even exceeds that of traditional designs that use multiple flashing LED chips combined with mechanical rotation. Moreover, as the scattering component has a small mass and low inertia, the load on the driving component 3 is significantly reduced. This not only reduces energy consumption and extends battery life, but also lowers mechanical wear and the failure rate. The long-term operational stability of the product in a wet underwater environment is therefore improved.

In summary, the present disclosure achieves a balance between low cost, small volume, and high dynamic lighting effects for a floating pool light, and thus has extremely high market promotion value.

The above descriptions are only some embodiments of the present disclosure and are not intended to limit the present disclosure. For those skilled in the art, the present disclosure may have various modifications and changes. Any modification, equivalent substitution, improvement, etc., made within the spirit and principle of the present disclosure shall be included in a protection scope of the present disclosure.

The invention claimed is:

1. A floating pool light comprising:
 a floating component configured as a hollow sealed structure, and configured for floating on a water surface;
 a light source component provided inside the floating component and configured for emitting light;
 a driving component mounted on the floating component; and
 a scattering component drivingly connected to the driving component and covering an outside of the light source component;
 wherein a light emitted by the light source component is configured to be irradiated onto the floating component via the scattering component, the scattering component is configured to convert a form of the light and project the converted light onto a target position of the floating component, and the driving component is configured to drive the scattering component to pivot relative to the light source component.

2. The floating pool light according to claim 1, wherein the floating component is made of a transparent material.

3. The floating pool light according to claim 1, wherein the scattering component comprises a refraction portion and a transition portion;
 the refraction portion is configured to cover the light source component;
 the transition portion is fixedly connected to the refraction portion an output shaft of the driving component is pivotally connected to the transition portion; and
 a surface inside the refraction portion is provided with a plurality of convex transparent bodies, the plurality of convex transparent bodies form a plurality of independent light collecting areas correspondingly on the refraction portion to project light to different positions on the floating component.

4. The floating pool light according to claim 3, wherein the refraction portion is configured as a hollow hemispherical structure.

5. The floating pool light according to claim 3, wherein an axis of the transition portion is coincided with an axis of the refraction portion.

6. The floating pool light according to claim 1, wherein the floating component has a first area and a second area, the scattering component faces the first area; and
 the floating pool light further comprises a reflective component provided inside the floating component and located in the first area, and the reflective component is configured to reflect light projected from the scattering component onto the reflective component to the second area.

7. The floating pool light according to claim 6, wherein a plurality of reflecting areas are provided on the reflective component, the plurality of reflecting areas are arranged about an axis of the reflective component, and the plurality of reflecting areas face different directions to reflect light to different positions of the second area.

8. The floating pool light according to claim 7, wherein the reflective component is configured as an umbrella-shaped structure.

9. The floating pool light according to claim 6, wherein the floating component comprises:
 a housing configured as a hollow structure with a top opening,
 a cover fitting over the top opening of the housing to seal the hollow structure of the housing, and
 a fixed mounting plate arranged on an inner surface of the cover,
 wherein the driving component is embedded in the fixed mounting plate, and the output shaft of the driving component extend toward the fixed mounting plate in a direction away from the cover.

10. The floating pool light according to claim 9, wherein an outer wall of the housing is provided with a mounting portion, the mounting portion is configured to be detachably connected to a target device; and
 the mounting portion is formed at a projection position of the reflective component to reflect the light blocked by the target device to the second area via the reflective component.

11. The floating pool light according to claim 9, further comprising:
 a control circuit board mounted on a side of the fixed mounting plate away from the cover,
 wherein the control circuit board is defined with a central hole, the output shaft of the driving component extends through the central hole to connect with the scattering component, the control circuit board is electrically connected to the driving component to control on and off of the driving component.

12. The floating pool light according to claim 11, wherein the light source component is configured to be integrated around the central hole, the light source component is located on a side of the control circuit board away from the driving component, the light source component has a color-adjusting function, and the control circuit board is configured to control on and off of the light source component and to switch a color of light emitted by the light source component.

13. The floating pool light according to claim 11, wherein the cover comprises:
 an upper cover sealed to the housing and covering the top opening, a side of the upper cover facing the housing being defined with a first receiving groove, the fixed mounting plate being defined with a second receiving groove opposite the first receiving groove, and the first receiving groove and the second receiving groove together forming a receiving space; and
 an outer cover engaged on an end surface of the upper cover away from the housing, and the outer cover being defined with a notch at a portion projected onto the first receiving groove.

14. The floating pool light according to claim 13, further comprising:
 a solar panel mounted in the second receiving groove of the fixed mounting plate, a portion of the upper cover projected onto the first receiving groove being made of the transparent material such that light passes through the upper cover via the notch to irradiate the solar panel, the solar panel being configured to convert light energy into electrical energy.

15. The floating pool light according to claim 14, further comprising: a power supply member installed in the fixed mounting plate and located between the solar panel and the driving component, the power supply member being electrically connected to the solar panel and the control circuit board respectively, the power supply member being configured to store the electrical energy converted by the solar panel and supply power to the driving component and the light source component via the control circuit board.

* * * * *